United States Patent
Watfa et al.

(10) Patent No.: US 8,447,652 B2
(45) Date of Patent: May 21, 2013

(54) SYSTEM AND METHOD FOR TARGETING ADVERTISING TO A DEVICE BASED ON INSTALLED APPLICATIONS

(75) Inventors: Allie K. Watfa, Urbana, IL (US);
Jonathan Kilroy, Champaign, IL (US);
Dale Nussel, Mahomet, IL (US);
Anupam Seth, Urbana, IL (US)

(73) Assignee: Yahoo! Inc., Sunnyvale, CA (US)

( * ) Notice: Subject to any disclaimer, the term of this patent is extended or adjusted under 35 U.S.C. 154(b) by 233 days.

(21) Appl. No.: 13/118,983

(22) Filed: May 31, 2011

(65) Prior Publication Data

US 2012/0310739 A1    Dec. 6, 2012

(51) Int. Cl.
*G06Q 30/00* (2012.01)

(52) U.S. Cl.
USPC ............................................. 705/14.64

(58) Field of Classification Search
USPC ............................................. 705/14.64
See application file for complete search history.

(56) References Cited

U.S. PATENT DOCUMENTS

| | | | |
|---|---|---|---|
| 8,060,406 B2 * | 11/2011 | Blegen | 705/14.58 |
| 2005/0027593 A1 * | 2/2005 | Wilson | 705/14 |
| 2005/0080665 A1 * | 4/2005 | Bowman-Amuah | 705/14 |
| 2012/0290583 A1 * | 11/2012 | Mahaniok et al. | 707/741 |

* cited by examiner

*Primary Examiner* — James W Myhre
(74) *Attorney, Agent, or Firm* — Stattler-Suh PC

(57) ABSTRACT

A system and method for targeting advertising to devices based on the applications installed on the device are provided. The system and method comprise retrieving data pertaining to the applications a user has installed on a device and assigning the applications weights based on their patterns of usage. The applications are categorized according to their genre and/or the time of day during which they are typically used, and each category is assigned a priority value based on the patterns of usage of the applications therein. An advertisement corresponding to the highest priority category is delivered to the device.

20 Claims, 7 Drawing Sheets

SYSTEM AND METHOD FOR TARGETING ADVERTISING TO A DEVICE BASED ON INSTALLED APPLICATIONS

FIELD OF THE INVENTION

The embodiments disclosed herein comprise a method and system for targeting advertising to computing devices. More particularly, the embodiments disclosed herein relate to a unique procedure for gathering data pertaining to the applications installed on a device and delivering targeted advertising to the device accordingly.

BACKGROUND

The growth and increasing sophistication of mobile devices is changing the dynamics of computing and Internet usage. Previously, the spread of mobile computing was hampered by the limited functionality and lack of network connectivity of early mobile devices. Early mobile phones could do little more than place telephone calls and were thus not thought of as computing devices. Although personal digital assistants (PDAs) did provide some advanced computing functionality, they typically did not include any means of wireless communication and needed to be paired with a desktop or laptop personal computer to transfer data or applications. Similarly, early tablet devices were designed with the rudimentary goal of replicating the desktop experience in a compact form factor and did not introduce a new model of computing. Thus, the computing experience was defined by the desktop operating system, wherein users installed applications from a variety of disparate sources and accessed online content almost exclusively through a web browser.

However, mobile platforms such as iOS™ by Apple and the Android™ operating system by Google have redefined the computing experience by introducing new models for providing functionality and delivering content to end users. By taking advantage of persistent or readily available Internet connections on mobile devices, mobile platforms provide a central repository through which end-users may download applications. Users can access an online application store or marketplace and browse a catalog of thousands of applications performing a variety of different functions. The applications may be categorized by genre, popularity, recency, or other attribute. With a few clicks, a user can download any application in the catalog through the same familiar interface. Providing a unified application distribution channel has enabled platform owners such as Apple and Google to streamline and simplify the application development process. Third party application developers are either required or strongly recommended to follow certain guidelines in designing their applications, which are packaged in a standardized manner as lightweight bundles for distribution through the application store or marketplace. This streamlined, efficient model of application delivery has had a profound impact on personal computing and has spread to desktop and laptop platforms. For example, in the 10.6.6 release of its OS X™ operating system, Apple introduced the Mac App Store™ for applications designed to run on Macintosh™ desktop and laptop personal computers.

In addition to introducing innovations in application delivery, mobile phones and tablet devices running mobile operating systems account for an increasing proportion of global Internet traffic and have enabled Internet users to access content in new and unique ways. Mobile phones and tablet devices with advanced features and Internet connectivity are becoming increasingly common, to the extent that Internet access itself is becoming ubiquitous. In addition, instead of providing access to content exclusively through a web browser, many mobile platforms provide applications that are custom-tailored to download and display content from a particular source. These applications may be developed by third parties and provided to end users through the platform's application store or marketplace. An application designed to deliver the content of a particular online portal or service may provide functionality analogous to that of the portal or service's website. For example, the Yahoo! Finance application for iOS provides access to the same content available through the Yahoo! Finance website, but in a manner that is custom tailored for iOS devices and takes advantage of the unique features of the platform and hardware. Thus, the users of such devices may access their favorite content portals through portal-specific applications instead of a web browser.

This new paradigm of mobile computing has important implications for targeted advertising. Existing techniques for delivering targeted advertising to Internet users are designed primarily for desktop platforms, on which online advertising is delivered via the web. On desktop platforms, the overwhelming majority of information used to target an advertisement to a user is gathered from the user's web browsing history. This is because a user's web browser is the principal tool by which the user accesses the Internet on a desktop or a laptop. However, as noted above, on a mobile device a greater proportion of the online content viewed by a user may be delivered via the applications a user has downloaded, and advertisements may be presented to the user within an application. In addition, unlike desktop platforms, the unified distribution channel for applications on mobile platforms imposes a higher degree of standardization on third party application developers, giving more control over the platform to the platform owner and allowing the tracking of information such as the applications a user has installed and their usage patterns.

Consequently, there is a need for a technique for utilizing information about the applications a user has installed on his device in targeting online advertising to the user. As will be demonstrated, the embodiments disclosed herein provide such a technique in an elegant manner.

SUMMARY OF THE INVENTION

The embodiments disclosed herein introduce a method and system for targeting online advertising to users of computing devices.

According to one series of embodiments, data pertaining to a plurality of applications installed on a device is retrieved. In this series of embodiments, a plurality of application weighting factors corresponding to the applications is calculated using the data and the applications are assigned to a plurality of genre categories. The application weighting factors may be determined using at least one of a total time accessed, a number of times accessed, a time elapsed since last access, and an application complexity metric, for each of the applications. The application complexity metric may be determined using at least one of a start up time, an application duration value, and a required memory value, for each of the applications. A plurality of priority values corresponding to the genre categories is calculated using the application weighting factors. A highest priority category from among the genre categories is determined using the priority values, and an advertisement corresponding to the highest priority category is selected for the device. In one such embodiment, a location of the device is determined. The location may be determined using at least one of a global positioning system (GPS) receiver, an internet protocol (IP) address, and a cell phone tower location, and the selected advertisement may further correspond to the location of the device.

According to another series of embodiments, the applications may be assigned to a plurality of time of use categories. Within the time of use categories, the applications are assigned to a plurality of genre groupings using the genre categories determined using the procedure described above. A plurality of use weights for the applications in each of the time of use categories are calculated and a plurality of genre weights corresponding to the genre groupings are determined using the use weights. The use weights may be calculated using at least one of a total time accessed, a number of times accessed, a time elapsed since last access, and an application complexity metric, for each of the applications within each of the time of use categories. The application complexity metric may be determined using at least one of a start up time, an application duration value, and a required memory value, for each of the applications within each of the time of use categories. A current time of use category is determined from among the time of use categories. A plurality of priority values corresponding to the genre categories is calculated according to the procedure described above, incorporating a subset of the plurality of genre weights determined using the current time of use category.

According to any of the embodiments described above and herein, the device may be a phone, a tablet device, or a personal computer.

DETAILED DESCRIPTION

Figure 1:
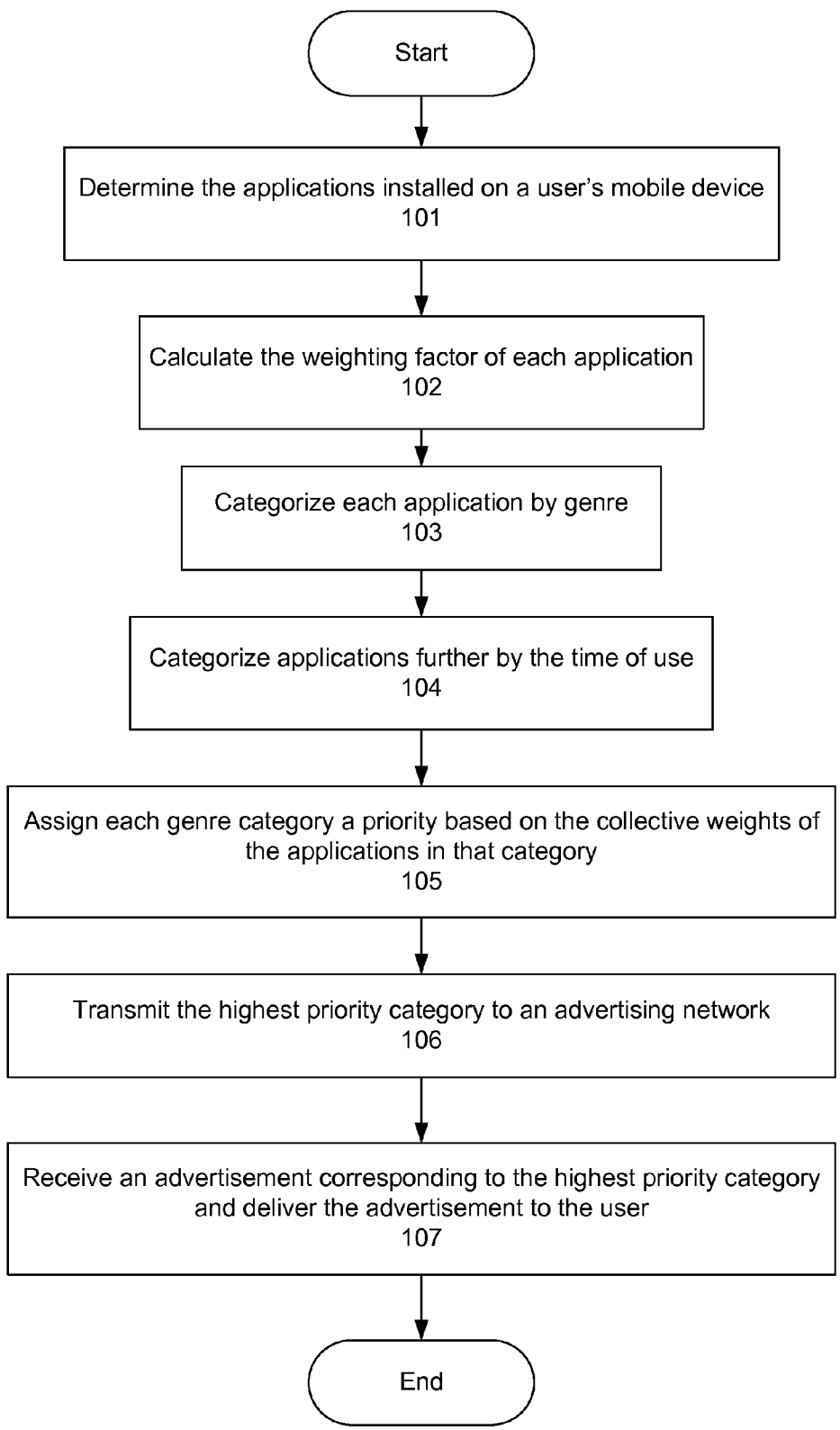
FIG. 1 depicts a flow diagram illustrating the operation of the invention according to an embodiment.

Since the advent of the Internet, online advertising has steadily evolved into a multi-billion dollar a year industry. Online portals such as Yahoo! operate advertising networks that target online advertising to Internet users based on their interests. Users' interests are determined by gathering data on their Internet browsing habits and targeting advertising accordingly. These networks target users by assigning them to segments based on the users' visits to certain websites. For example, a user who visits a sports website may be added to a sports segment by an advertising network, and the user may subsequently be presented with advertisements pertaining to sports upon visiting other websites within the advertising network.

These advertising networks typically operate by using cookies to track users' browsing history. Upon visiting a webpage from which a user connects with an advertising network for the first time, the network writes a cookie onto the user's hard drive that uniquely identifies the user to the network. On subsequent visits to websites within the advertising network, the advertising network accesses the previously created cookie and updates a user profile constructed from the user's browsing history. Because the overwhelming majority of online content accessed by Internet users on a desktop or a laptop is delivered via a web browser, this approach suffices for desktops and laptop platforms. However, the advent of mobile computing has presented a new set of challenges.

Mobile devices have many unique characteristics and features that distinguish them from desktop and laptop computers. Mobile devices are highly personalized and, unlike desktop and laptop computers, are typically not shared between users. Users often carry their mobile devices with them and leave them on at all times. Many mobile devices include global positioning system (GPS) receivers, allowing the mobile platform operating system to transmit the user's location to remote entities. Perhaps most importantly, new models of content delivery have emerged to accommodate the smaller form factor of mobile devices.

On a mobile phone or a tablet device, the user may access online content through various different applications in addition to a web browser. Because of the smaller form factor of mobile phones and tablet devices, mobile web browsers are limited in what they can display, and many sites deliver downsized versions of web pages to users who access them from mobile devices. In addition, browsing the web on a mobile device can be cumbersome due to the smaller form factor and (on many devices) the lack of a hardware keyboard. Consequently, unlike desktop platforms, a large portion of online content accessed by users of mobile platforms is delivered through portal-specific applications. Thus, simply tracking which sites the user has accessed with a mobile web browser is unlikely to yield an accurate or complete user profile upon which to base the targeting of advertisements.

Instead, mobile platforms are better suited for a technique that accounts for the unique features and characteristics of mobile devices. A technique that segments users based on the applications the users have installed on their mobile devices and the manner and frequency with which they use them would be more effective in delivering advertising that accurately reflects the users' interests. The applications that a user has installed on his mobile device are better indicators of the user's interests and reveal information about the user's online and non-online computing activities. Because of the highly personalized nature of mobile devices, the applications installed on a user's mobile device are likely to have been downloaded by the owner of the device and not by others. The design and implementation of the embodiments disclosed herein have thus been guided by the goal of using information about the applications a user has installed on his device in lieu of his browsing history in targeting online advertisements.

The operation of one embodiment of the invention is illustrated by the flow diagram 100 depicted in FIG. 1. At step 101, the applications installed on a user's device are determined. This may be accomplished through a number of different techniques. The platform may provide access to this information directly through a simple subroutine call. Alternatively, the application store or marketplace may provide access to the user's application download history. In this embodiment, the application store or marketplace may transmit a list of applications the user has installed from a remote server. In any embodiment, the information about a user's applications may further include data pertaining to the usage patterns of each application, such as the total amount of time the user spent using each application and how many instances each application was accessed. Any technique for determining the applications installed on a user's device may be used without deviating from the spirit or scope of the invention.

At step 102, the weighting factor of each application is calculated. The weighting factor represents a determination of how representative a particular application is of a user's interests. According to one embodiment, the application weighting factor may be calculated based on the amount of time an application is accessed during a given time period, the number of times an application is accessed during a time period, the amount of time that has elapsed since the application was last accessed, and a metric corresponding to the complexity of the application. Any criteria or means of determining the weighting factor of each application may be used without deviating from the spirit or scope of the invention.

At step 103, each application is categorized by genre. This may be determined from the classification of the application within the application store or marketplace or from a separate taxonomy developed specifically for advertising purposes. An application may be assigned to multiple categories, and multiple applications may be grouped into a single category. For example, the application Yahoo! Finance may be assigned to the categories "Finance" and "Online Services". The category "Finance" may further include a financial calculator application with no online functionality, and the category "Online Services" may further include a social networking application with no finance-related content. The genre categorization roughly corresponds to user segmenting, and categories may represent broad genres or very specific ones. Any protocol for categorizing applications may be used without deviating from the spirit or scope of the invention.

At step 104, the applications are further categorized by the time during which they are used. For example, if the user uses the Yahoo! Finance application on weekdays during working hours, then Yahoo! Finance may be assigned to a working hours category. If the user uses the Yahoo! Messenger application during commuting hours, then the Yahoo! Messenger application may be assigned to a commuting hours category. An application may be assigned to more than one category, and a category may include more than one application. Any technique for categorizing applications by the time of use may be used without deviating from the spirit or scope of the invention.

At step 105, each genre category is assigned a priority based on the collective weights of the applications in that category, as determined in step 102. According to one embodiment, the priority of a category is computed as the sum of the weighting factors of each application in the category. According to another embodiment, the priority computation incorporates the time of use categorizations determined in step 104. The categories may then be ranked according to priority. Any technique for determining priority may be used without deviating from the spirit or scope of the invention. At step 106, the highest priority category is transmitted to an advertising network.

At step 107, an advertisement corresponding to the highest priority category is received from the advertising network and delivered to the user. According to one embodiment, the advertisement may be selected remotely from a repository of advertisements that is paired to each category using a matrix. In this embodiment, the data collected regarding the applications installed on a user's device is transmitted to an advertising server, where the advertisement is selected. The advertisement may be delivered to the user within a browser application on the user's device or within another application. Alternatively, the advertisement may be delivered to the user on his desktop. In this embodiment, the user may be identified by the platform owner or advertising network and paired with his user device if the user has signed in to an online service operated by the platform owner or advertising network from a desktop or laptop computer. Any technique for selecting or delivering the advertisement may be used without deviating from the spirit or scope of the invention.

Portions of the procedure described above may need to be repeated periodically in order to continue delivering targeted advertising that accurately reflects the user's current interests. The applications installed on a user's device and their usage patterns can change frequently as the user removes applications, downloads and installs new ones, uses some applications less, and begins using other applications more. Thus, the data pertaining to the user's applications upon the basis of which advertising is selected should be kept up-to-date. According to one series of embodiments, steps 101 through 104 are repeated at designated intervals. In one such embodiment, these steps may be performed in a batch operation executed every week or every month. In another such embodiment, the steps may be repeated every time a modification is made to a user's set of installed applications, such as the installation, removal, or updating of an application. Any protocol for keeping application data up-to-date may be used without deviating from the spirit or scope of the invention.

Figure 2:
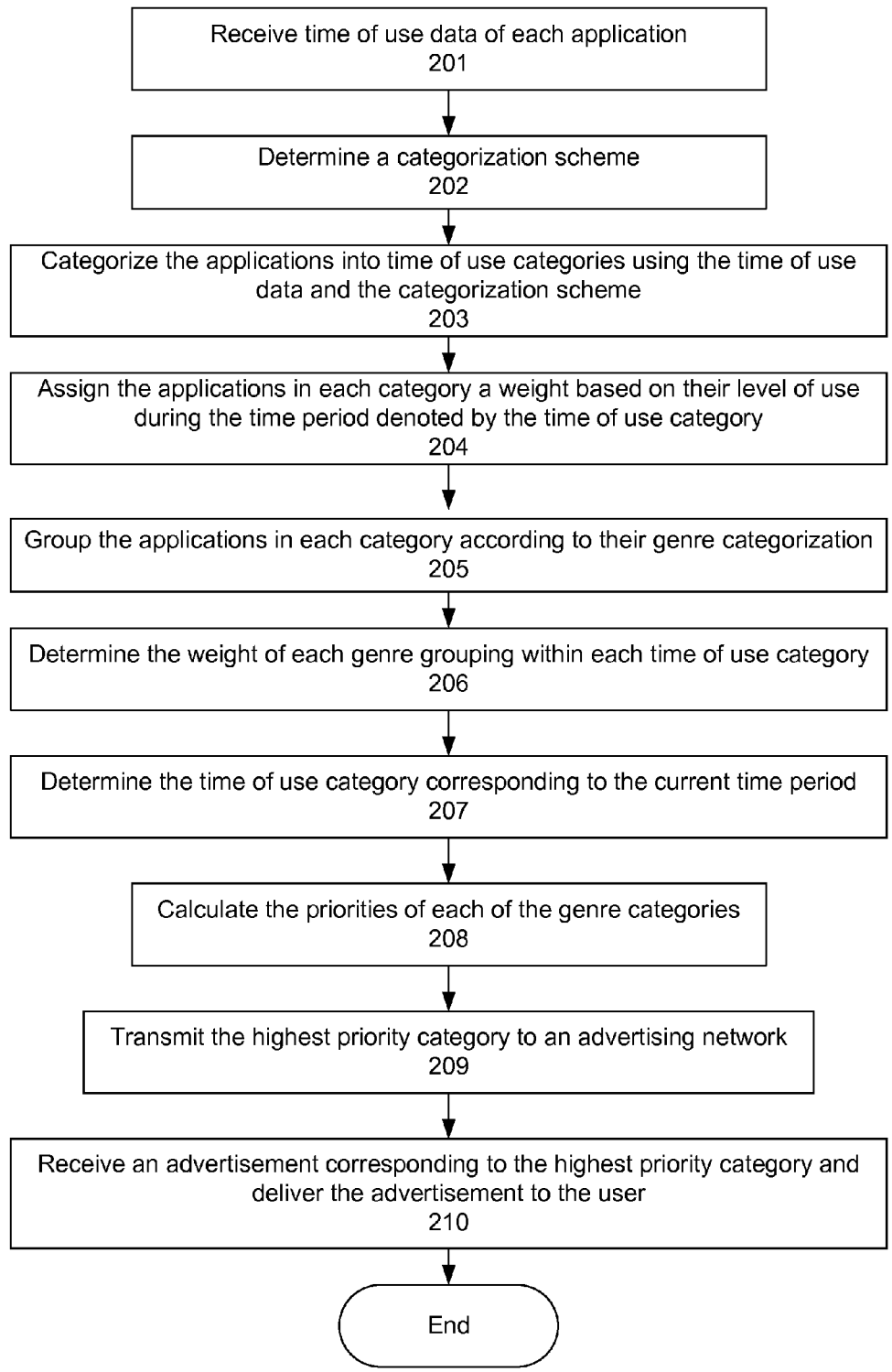
FIG. 2 depicts a flow diagram illustrating the operation of the invention according to an embodiment.

Steps 104, 105, 106 and 107 of the flow diagram 100 are illustrated further according to an embodiment by the flow diagram 200 depicted in FIG. 2. At step 201, time of use data of each application is received. At step 202, a categorization scheme is determined. For example, the categorization scheme may be limited to days of the week, e.g., each category corresponds to a different day of the week. Alternatively, the categorization scheme may correspond to particular types of time periods, e.g., working hours, commuting hours, evening hours, etc. Alternatively, the categorization scheme may correspond to time periods of the day, e.g., morning, afternoon, evening, late night, etc. Any categorization scheme may be used without deviating from the spirit or scope of the invention.

At step 203, the applications are categorized into time of use categories using the time of use data and the categorization scheme. For example, if the categorization scheme corresponds to days of the week and Application A is used only on Mondays and Fridays, then Application A is assigned to the Monday category and the Friday category. At step 204, the applications in each category are assigned a weight based on their level of use during the time period denoted by the category. In one embodiment, these weights are absolute, and are correlated only to the number of instances or amount of time an application is used. For example, if Application A is used for an average of fifteen minutes on Fridays and an average of half an hour on Mondays, then Application A is assigned a greater weight in the Monday category than in the Friday category. Similarly, if the device is used more frequently or for greater lengths of time on Mondays than on Fridays, then the sum of the weights of the applications in the Monday category is greater than the sum of the weights of the applications in the Friday category.

At step 205, the applications in each category are grouped according to their genre categorization determined in step 103. At step 206, the weight of each genre grouping within each time of use category is determined. This may be taken as a cumulative value by simply adding up the weights of the applications within each genre grouping. Alternatively, this may be taken as an average of the weights of the applications within each genre grouping. Any technique for determining the weight of each genre grouping may be used without deviating from the spirit or scope of the invention. At step 207, the time of use category corresponding to the current time period is determined.

At step 208, the priorities of each of the genre categories determined in step 103 are calculated, as described above with respect to step 105. In this embodiment, for each genre category, the calculation takes into account the weight of the corresponding genre grouping in the time of use category denoting the current time period, as determined in step 206. If no applications from a genre grouping have been used during the current time period, then no weight is added to the priority of that genre grouping's corresponding genre category. If the device is seldom used during the current time period, then the weights of the genre groupings would likely have little bearing on the priority of each genre category. Conversely, if the device is heavily used during the current time period, then the weights of the genre groupings are likely to be a significant factor in the priority calculation, and the genre category with the highest priority is likely to correspond to the genre grouping with the highest weight. At step 209, the highest priority category is transmitted to an advertising network. At step 210, an advertisement corresponding to the highest priority category is received from the advertising network and delivered to the user.

According to one series of embodiments, a user may be presented with an advertisement that is specific to his current location. For example, a user who accesses his device while at work may receive an advertisement for an establishment that is located near his workplace. This functionality may be enabled by a GPS receiver within the device, a standard feature in many smartphones. The platform operating system may receive the user's coordinates from the GPS module within the device and transmit them to an external entity, which translates them to an address on a map. Alternatively, in devices that lack GPS receivers, the user's location may be approximated using the Internet Protocol (IP) address of the device, or the location of the cellular transmission tower that the device connects to for sending and receiving data. Any technique for determining the user's location may be used without deviating from the spirit or scope of the invention. An advertising network may utilize this information to enhance the accuracy and precision of targeted advertisements.

Figure 3:
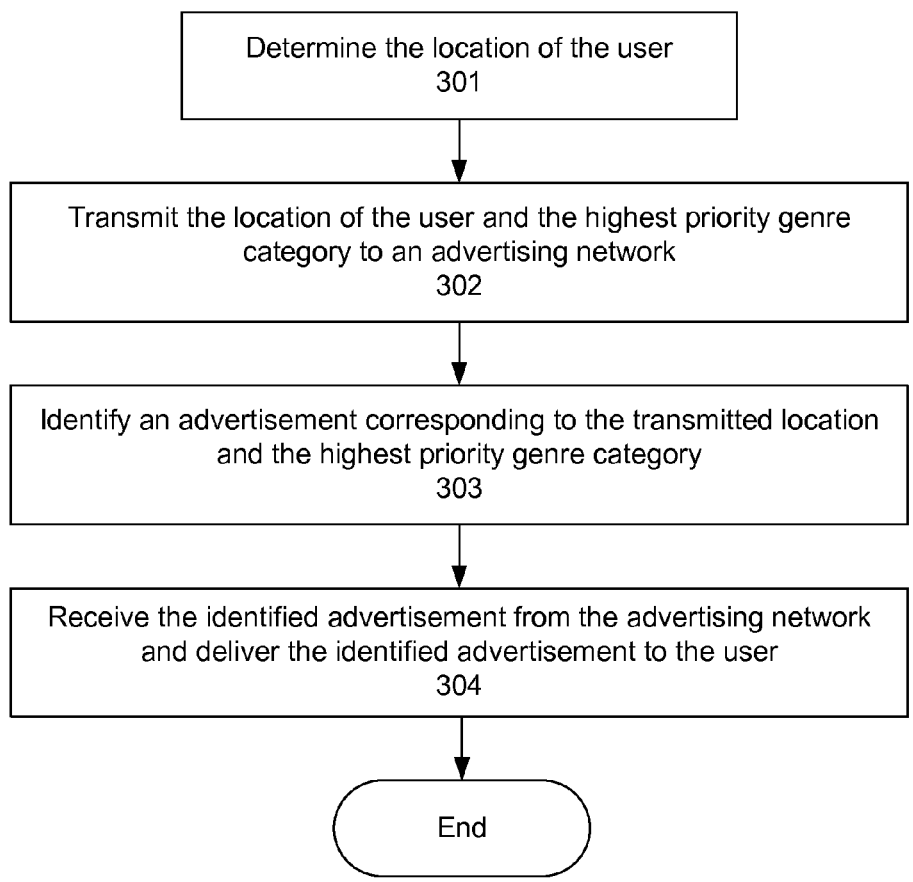
FIG. 3 depicts a flow diagram illustrating the operation of the invention according to an embodiment.

One such embodiment is illustrated by the flow diagram 300 depicted in FIG. 3, which corresponds to steps 106 and 107 of the flow diagram 100 depicted in FIG. 1 or steps 209 and 210 of the flow diagram 200 depicted in FIG. 2. At step 301, the location of the user is determined. At step 302, the location of the user and the highest priority genre category, which may be determined according to the procedure described in relation to step 105 or step 208 above, are transmitted to an advertising network. At step 303, an advertisement corresponding to the transmitted location and the highest priority genre category is identified. For example, if the user's location is in Manhattan, New York and the highest priority genre category is Fine Dining, then advertisements for upscale restaurants in Manhattan would be identified. At step 304, the identified advertisement is received from the advertising network and delivered to the user.

According to one series of embodiments, the application weighting factor described above in relation to step 102 of the procedure depicted in flow diagram 100 may be computed using a mathematical formula. As noted above, the mathematical formula may take factors such as the amount of time an application is accessed during a given time period, the number of times an application is accessed during a time period, the amount of time that has elapsed since the application was last accessed, and a metric denoting to the complexity of the application into account. In one such embodiment, the following formula may be used:

$$W_A = \text{time}_{week} + (\text{duration}_{week} \times \text{complexity}) - \text{last}$$

wherein $W_A$ is the weight of Application A, $\text{time}_{week}$ is the total time in minutes that Application A was accessed in a week, $\text{duration}_{week}$ is the average duration of time in minutes for which Application A was accessed during the week, complexity is the application complexity factor (a metric denoting the complexity of Application A), and last is the number of days that have elapsed since Application A was last accessed. Any formula for determining the application weighting factors may be used without deviating from the spirit or scope of the invention.

In one series of embodiments, the application complexity factor corrects for disparities in the complexity of each application. Because some applications are larger and have longer processing times than others, the total length of time an application is used may not be an accurate measure of how important it is to the user. For example, if Application A connects to several remote servers and executes a series of complex algorithms upon startup, it may take a lengthy amount of time to load. Meanwhile, Application B may be a simple application that has limited functionality but loads up quickly. If Application A starts up once during the time in which it takes Application B to start up five times, deriving the application weighting factor exclusively from the total time that each application is used would yield equivalent results for Application A and Application B if a user accessed Application A once but accessed Application B five times during a given time interval. This may not accurately reflect the user's interests, since he has accessed Application A once but accessed Application B five times. Incorporating the number of instances that each application is accessed into the application weighting factor may not entirely correct for this discrepancy. Even if Application A and Application B were of equal complexity, the number of instances that each application is accessed would seem to indicate that Application B is more important to the user than Application A, which also may not be the case.

Thus, in this series of embodiments, the application complexity factor normalizes the weighting factor of each application. In one such embodiment, the application complexity factor is determined based on how long the application takes to start up, whether the application is a short duration application or a long duration application, and the amount of memory that the application requires. These factors may be represented by the following formula:

$$C_A = \frac{\text{duration} * 3 + \text{mem\_size} + \text{startup\_time}}{10} + 0.1$$

wherein $C_A$ is the complexity factor of Application A, duration is a binary value indicating whether the application is a short duration application or a long duration application, mem_size is a value indicating how much memory the application requires, and startup_time is a value indicating how long the application takes to start up. mem_size and startup_time may be absolute figures or values along a relative scale (e.g., low=1, mid=2, high=3, etc). In this embodiment, the complexity factor may range from 1 (highest) to 0.1 (lowest).

Figure 4:
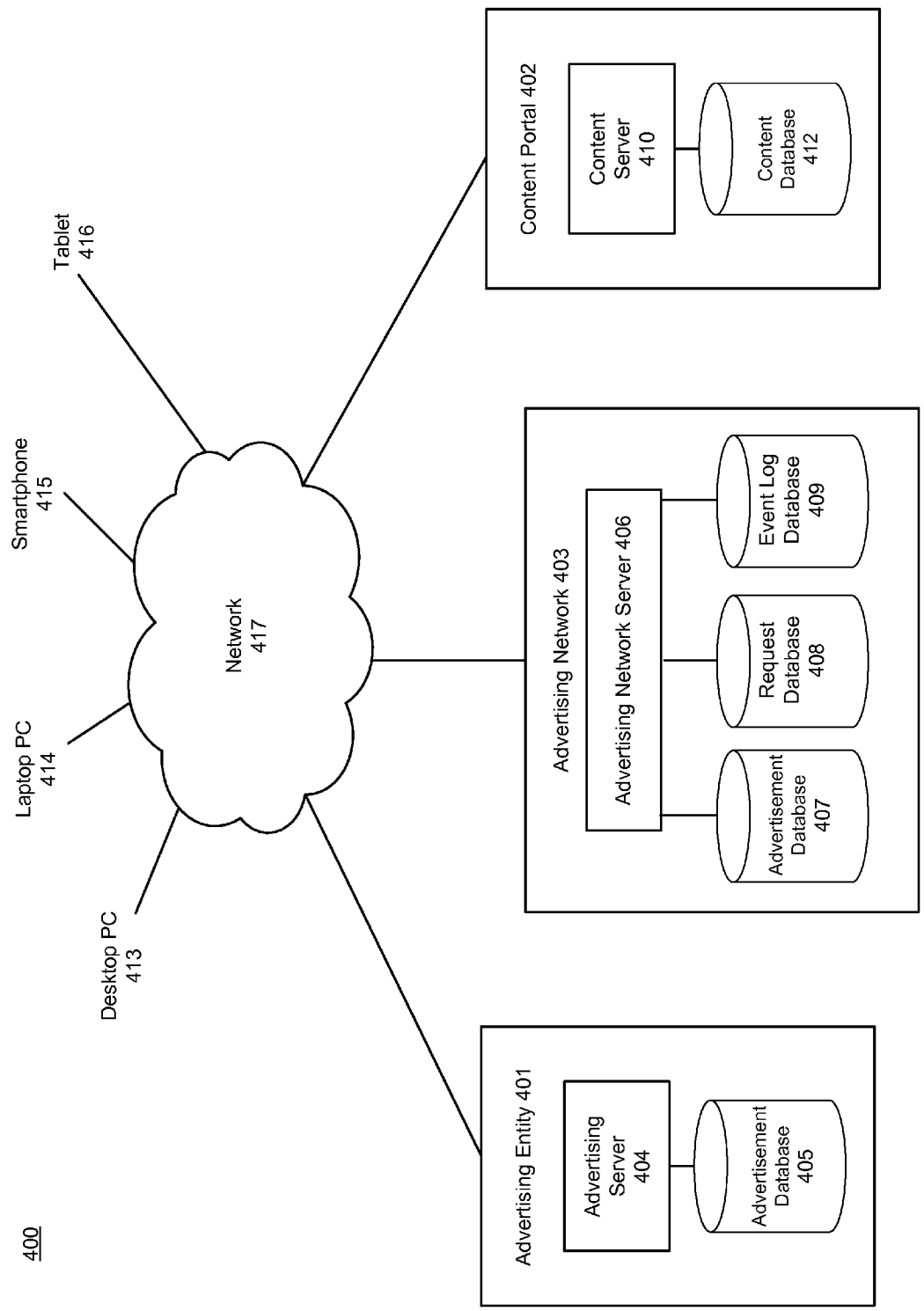
FIG. 4 depicts a block diagram illustrating an exemplary environment within which some embodiments of the invention operate according to an embodiment.

An exemplary environment 400 within which some embodiments of the invention may operate is illustrated in FIG. 4. The diagram of FIG. 4 depicts an advertising entity 401, a content portal 402, an advertising network 403, and client devices 413-416. The advertising entity 401 is a provider of products or services who seeks to place an online advertisement within the content portal 402. The advertising entity 401 includes an advertising server 404 and an advertisement database 405. The content portal 402 is a publisher or other provider of online content that seeks advertisements from advertising entity 401. The content portal 402 includes a content server 410 and a content database 412. The advertising network 403 matches requests for advertisements received from the content portal 402 or the client devices 413-416 with advertisements received from the advertising entity 401. The advertising network 403 includes an advertising network server 406, an advertisement database 407, a request database 408, and an event log database 409.

According to one embodiment, the advertising network 403 may be affiliated with and/or operated by the content portal 402. In this embodiment, there may be a direct connection (not pictured) between the advertising network 403 and the content portal 402. The client devices may include a desktop PC 413, a laptop PC 414, a smartphone 415, a tablet PC 416, or any other device capable of displaying a web page. All communication between and among the advertising entity 401, the content portal 402, the advertising network 403, and the client devices 413-416 occurs over the network 417. Although the embodiments disclosed herein have been described with respect to mobile devices such as a smartphone 415 or a tablet 416, they may also be applied to non-mobile devices such as a desktop PC 413 or a laptop PC 414. The embodiments recited above may be executed wholly or partially within any of client devices 413-416, advertising network 403, and content portal 402.

Figure 5:
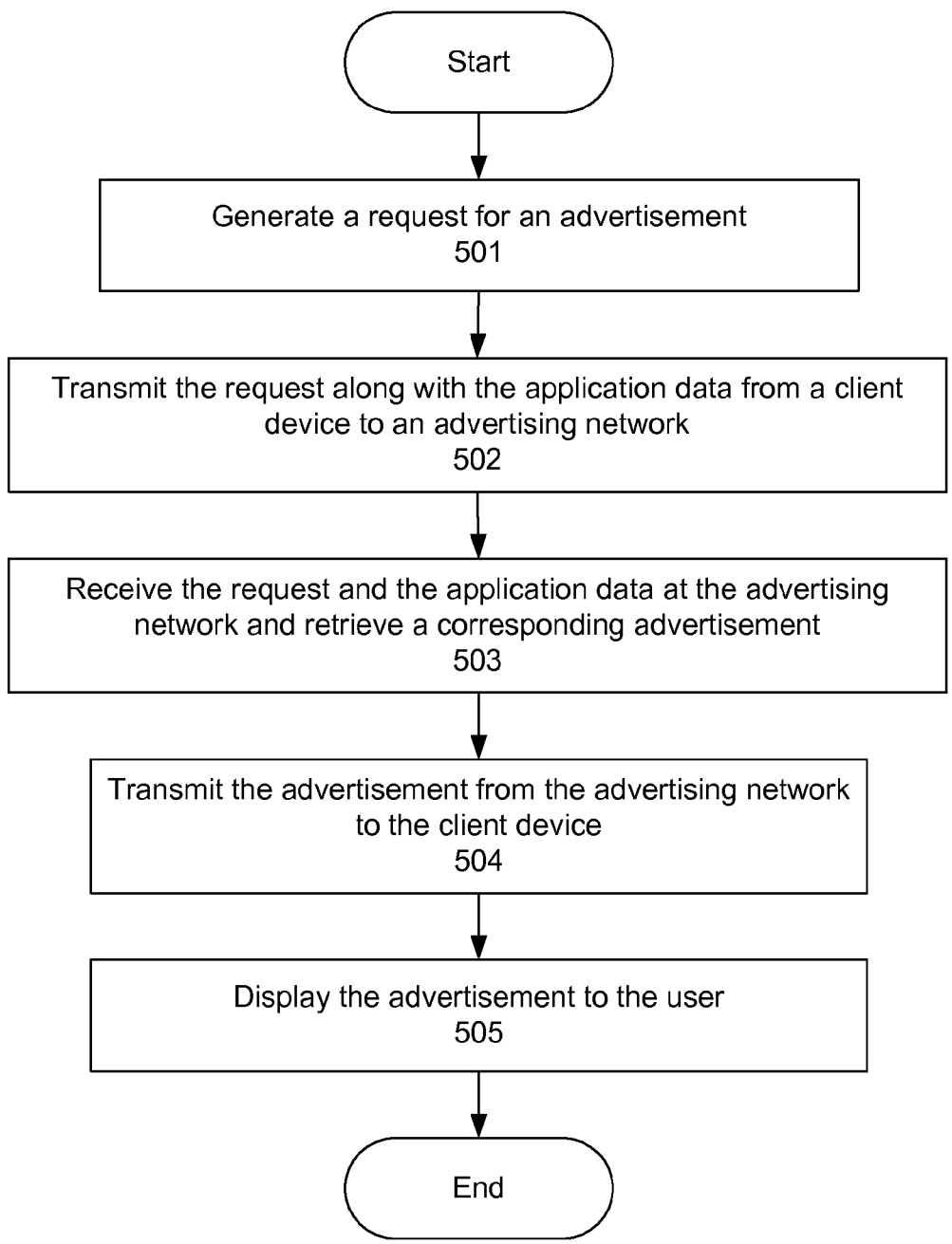
FIG. 5 depicts a flow diagram illustrating the operation of the invention according to an embodiment.

The operation of various elements of the environment 400 according to an embodiment is illustrated in the flowchart 500 depicted in FIG. 5. At step 501, an application on a client device 413-416 generates a request for an advertisement. The application may be a web browser, a portal-specific content browser, an application with only limited networked functionality (such as a calculator or a game), or the operating system itself. At step 502, the client device transmits the request along with the device application data (gathered and computed according to any of the embodiments described above) to the advertising network 403. At step 503, the advertising network receives the request and the application data and retrieves a corresponding advertisement. At step 504, the advertising network transmits the advertisement to the client device. At step 505, the client device displays the advertisement to the user and the procedure ends.

Figure 6:
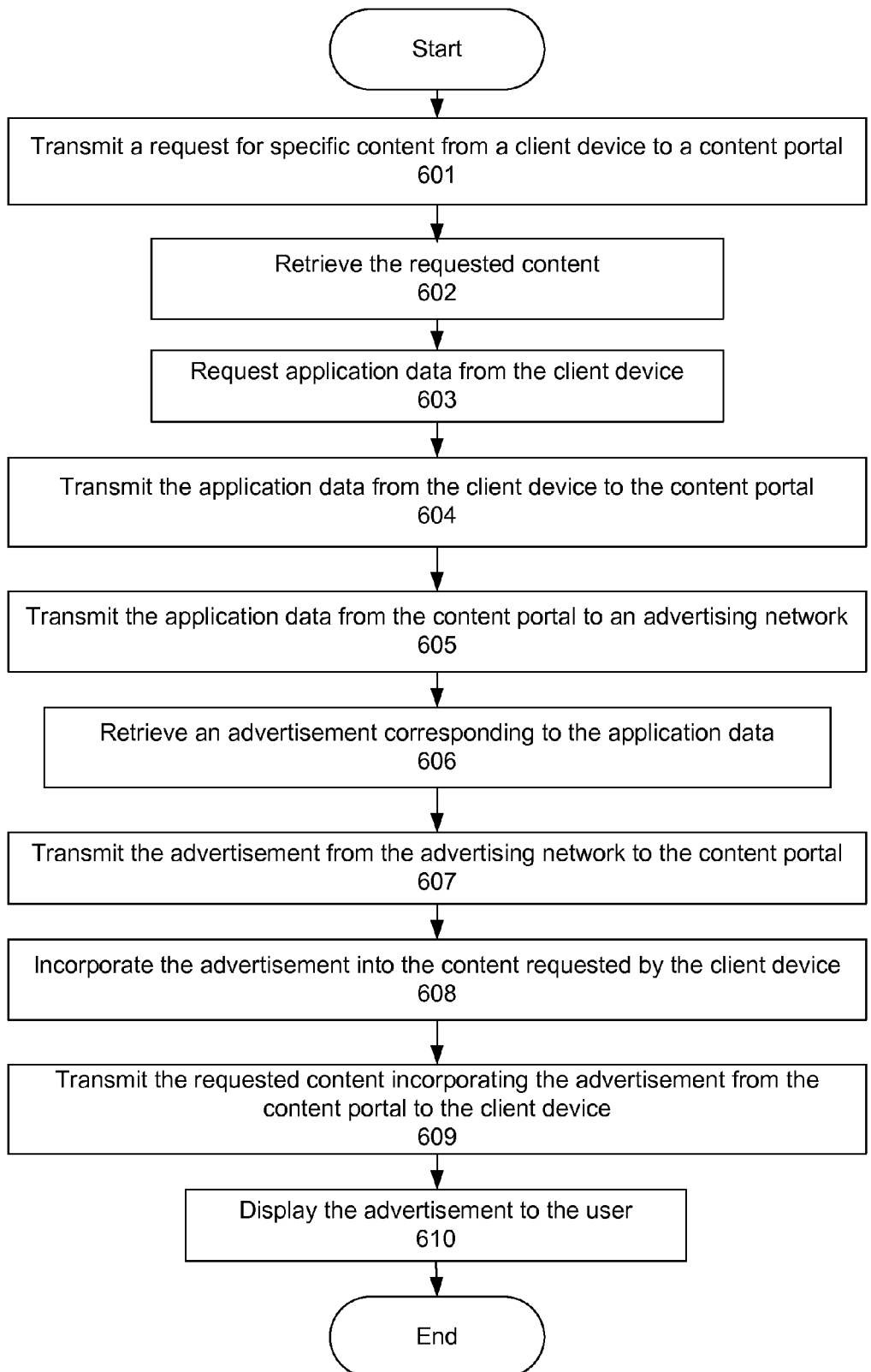
FIG. 6 depicts a flow diagram illustrating the operation of the invention according to an embodiment.

The operation of various elements of the environment 400 according to an alternate embodiment is illustrated in the flowchart 600 depicted in FIG. 6. This embodiment may operate within variations of environment 400 in which client devices 413-416 do not communicate directly with the advertising network 403. At step 601, any device from among client devices 413-416 transmits a request for specific content to the content server 410. The content may be a webpage for display within a web browser or other multimedia data for display within a portal-specific application. At step 602, the content server 410 retrieves the requested content from the content database 412. At step 603, the content server 410 requests application data from the client device. At step 604, the client device transmits the application data to the content server 410. At step 605, the content server 410 transmits the application data to the advertising network 403. At step 606, the advertising network server 406 retrieves an advertisement corresponding to the application data from the advertisement database 407. At step 607, the advertising network 406 transmits the advertisement to the content portal 402. At step 608, the content server 410 incorporates the advertisement into the content requested by the client device. At step 609, the content server 410 transmits the requested content incorporating the advertisement to the client device. At step 610, the client device displays the advertisement to the user and the procedure ends.

Figure 7:
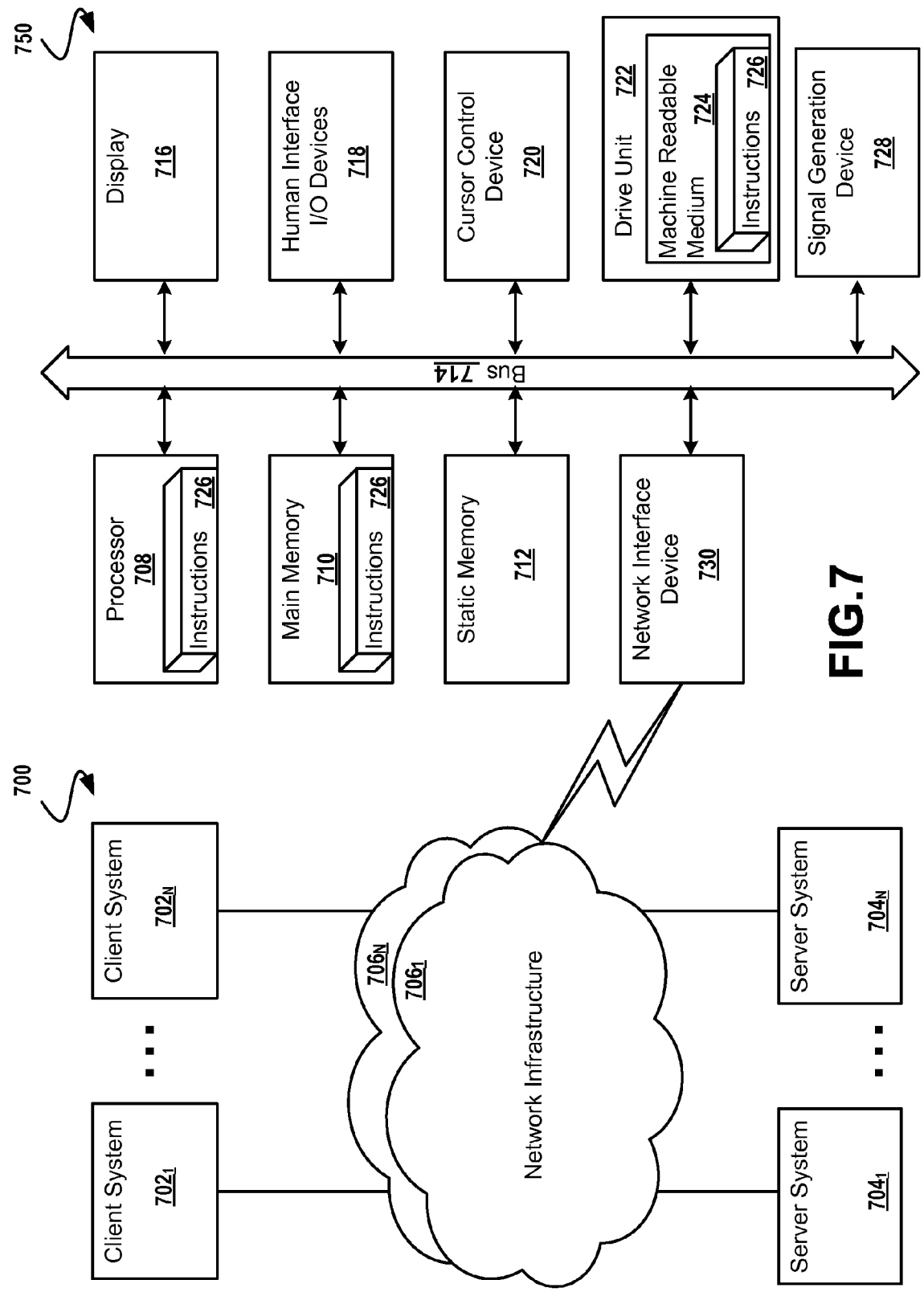
FIG. 7 depicts a block diagram illustrating hardware embodiments of the present invention.

FIG. 7 is a diagrammatic representation of a network 700, including nodes for client computer systems $702_1$ through $702_N$, nodes for server computer systems $704_1$ through $704_N$, nodes for network infrastructure $706_1$ through $706_N$, any of which nodes may comprise a machine 750 within which a set of instructions for causing the machine to perform any one of the techniques discussed above may be executed. The embodiment shown is purely exemplary, and might be implemented in the context of one or more of the figures herein.

Any node of the network 700 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 750 includes a processor 708 (e.g. a processor core, a microprocessor, a computing device, etc), a main memory 710 and a static memory 712, which communicate with each other via a bus 714. The machine 750 may further include a display unit 716 that may comprise a touchscreen, or a liquid crystal display (LCD), or a light emitting diode (LED) display, or a cathode ray tube (CRT). As shown, the computer system 750 also includes a human input/output (I/O) device 718 (e.g. a keyboard, an alphanumeric keypad, etc), a pointing device 720 (e.g. a mouse, a touch screen, etc), a drive unit 722 (e.g. a disk drive unit, a CD/DVD drive, a tangible computer readable removable media drive, an SSD storage device, etc), a signal generation device 728 (e.g. a speaker, an audio output, etc), and a network interface device 730 (e.g. an Ethernet interface, a wired network interface, a wireless network interface, a propagated signal interface, etc).

The drive unit 722 includes a machine-readable medium 724 on which is stored a set of instructions (i.e. software, firmware, middleware, etc) 726 embodying any one, or all, of the methodologies described above. The set of instructions 726 is also shown to reside, completely or at least partially, within the main memory 710 and/or within the processor 708.

The set of instructions 726 may further be transmitted or received via the network interface device 730 over the network bus 714.

It is to be understood that the embodiments disclosed herein may be used as, or to support, a set of instructions executed upon some form of processing core (such as the CPU of a computer) or otherwise implemented or realized upon or within a machine- or computer-readable medium. A machine-readable medium includes any mechanism for storing information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

The invention claimed is:

1. A computer-implemented method for targeting online advertising, the method comprising:
    retrieving data by an advertising network server pertaining to a plurality of applications installed on a client device;
    calculating by the advertising network server a plurality of application weighting factors corresponding to the applications using the data;
    assigning by the advertising network server the applications to a plurality of genre categories;
    calculating by the advertising network server a plurality of priority values corresponding to the genre categories using the application weighting factors;
    determining by the advertising network server a highest priority category from among the genre categories using the priority values; and
    selecting by the advertising network server an advertisement for the client device corresponding to the highest priority category.

2. The computer implemented method of claim 1 further comprising determining a location of the client device.

3. The computer implemented method of claim 2, wherein the location of the client device is determined using at least one of a global positioning system (GPS) receiver, an internet protocol (IP) address, and a cell phone tower location.

4. The computer implemented method of claim 2, wherein the advertisement further corresponds to the location of the client device.

5. The computer implemented method of claim 1, wherein the application weighting factors are determined using at least one of a total time accessed, a number of times accessed, a time elapsed since last access, and an application complexity metric, for each of the applications.

6. The computer implemented method of claim 5, wherein the application complexity metric is determined using at least one of a start up time, an application duration value, and a required memory value, for each of the applications.

7. The computer implemented method of claim 1, further comprising:
    assigning the applications to a plurality of time of use categories;
    assigning the applications within the time of use categories to a plurality of genre groupings using the genre categories;
    calculating a plurality of use weights for the applications in each of the time of use categories;
    determining a plurality of genre weights corresponding to the genre groupings using the use weights;
    determining a current time of use category from among the time of use categories; and
    wherein the priority values are further calculated using a subset of the plurality of genre weights determined using the current time of use category.

8. The computer implemented method of claim 7, wherein the use weights are calculated using at least one of a total time accessed, a number of times accessed, a time elapsed since last access, and an application complexity metric, for each of the applications within each of the time of use categories.

9. The computer implemented method of claim 7, wherein the application complexity metric is determined using at least one of a start up time, an application duration value, and a required memory value, for each of the applications within each of the time of use categories.

10. The computer implemented method of claim 1, wherein the client device is at least one of a phone, a tablet device, and a personal computer.

11. A tangible, non-transitory computer readable medium that stores a set of instructions which, when executed by a computer, cause the computer to execute steps for targeting online advertising, the steps comprising:
    retrieving data by an advertising network server pertaining to a plurality of applications installed on a client device;
    calculating by the advertising network server a plurality of application weighting factors corresponding to the applications using the data;
    assigning by the advertising network server the applications to a plurality of genre categories;
    calculating by the advertising network server a plurality of priority values corresponding to the genre categories using the application weighting factors;
    determining by the advertising network server a highest priority category from among the genre categories using the priority values; and
    selecting by the advertising network server an advertisement for the client device corresponding to the highest priority category.

12. The computer readable medium of claim 11 further comprising determining a location of the client device.

13. The computer readable medium of claim 12, wherein the location of the client device is determined using at least one of a global positioning system (GPS) receiver, an internet protocol (IP) address, and a cell phone tower location.

14. The computer readable medium of claim 12, wherein the advertisement further corresponds to the location of the client device.

15. The computer readable medium of claim 11, wherein the application weighting factors are determined using at least one of a total time accessed, a number of times accessed, a time elapsed since last access, and an application complexity metric, for each of the applications.

16. The computer readable medium of claim 15, wherein the application complexity metric is determined using at least one of a start up time, an application duration value, and a required memory value, for each of the applications.

17. The computer readable medium of claim 11, the steps further comprising:
    assigning the applications to a plurality of time of use categories;
    assigning the applications within the time of use categories to a plurality of genre groupings using the genre categories;
    calculating a plurality of use weights for the applications in each of the time of use categories;
    determining a plurality of genre weights corresponding to the genre groupings using the use weights;
    determining a current time of use category from among the time of use categories; and wherein the priority values are further calculated using a subset of the plurality of genre weights determined using the current time of use category.

18. The computer readable medium of claim 17, wherein the use weights are calculated using at least one of a total time accessed, a number of times accessed, a time elapsed since last access, and an application complexity metric, for each of the applications within each of the time of use categories.

19. The computer readable medium of claim 17, wherein the application complexity metric is determined using at least one of a start up time, an application duration value, and a required memory value, for each of the applications within each of the time of use categories.

20. The computer readable medium of claim 11, wherein the client device is at least one of a phone, a tablet device, and a personal computer.

* * * * *